United States Patent
Young et al.

Patent Number: 6,122,742
Date of Patent: Sep. 19, 2000

[54] AUTO-RECOVERABLE AND AUTO-CERTIFIABLE CRYPTOSYSTEM WITH UNESCROWED SIGNING KEYS

[76] Inventors: Adam Lucas Young, 535 W. 110th St., Apt. 12J; Marcel Mordechay Yung, 605 W. 112th St., Apt. 4H, both of New York, N.Y. 10025

[21] Appl. No.: 08/878,189

[22] Filed: Jun. 18, 1997

[51] Int. Cl.[7] .................................................. H04L 9/00
[52] U.S. Cl. ........................ 713/201; 713/171; 713/176; 380/278; 380/281; 380/283
[58] Field of Search ................................ 380/278, 281, 380/283, 44, 47, 28; 713/171, 176, 182, 201

[56] References Cited

U.S. PATENT DOCUMENTS

| | | |
|---|---|---|
| 4,200,770 | 4/1980 | Hellman et al. |
| 4,218,582 | 8/1980 | Hellman et al. |
| 4,405,829 | 9/1983 | Rivest et al. |
| 4,424,414 | 1/1984 | Hellman et al. |
| 4,625,076 | 11/1986 | Okamoto et al. |
| 4,641,346 | 2/1987 | Clark et al. |
| 4,748,668 | 5/1988 | Shamir et al. |
| 4,881,264 | 11/1989 | Merkle . |
| 4,933,970 | 6/1990 | Shamir . |
| 4,995,082 | 2/1991 | Schnorr . |
| 5,005,200 | 4/1991 | Fischer . |
| 5,097,504 | 3/1992 | Camion et al. |
| 5,231,668 | 7/1993 | Kravitz . |
| 5,276,737 | 1/1994 | Micali . |
| 5,315,658 | 5/1994 | Micali . |
| 5,557,346 | 9/1996 | Lipner et al. |
| 5,557,765 | 9/1996 | Lipner et al. |
| 5,633,928 | 5/1997 | Lenstra et al. |
| 5,640,454 | 6/1997 | Lipner et al. |
| 5,647,000 | 7/1997 | Leighton . |
| 5,796,830 | 8/1998 | Johnson et al. |
| 5,815,573 | 9/1998 | Johnson et al. |

OTHER PUBLICATIONS

"Applied Cryptography", Schneier, pp. 5, 28, 32, 42, 43, 178, 266, 421, 465, 597, 1995.

"Provably Secure and Practical Identification Schemes and Corresponding Signature Schemes", Tatsuaki Okamoto, pp. 32–53. Federal Register/vol. 62, No.92/Tuesday, May 13,1997/Notices, pp. 26293,26294.

R. Anderson, M. Roe, "The GCHQ Protocol and Its Problems", Eurocrypt '97, pp. 134–148, Springer–Verlag 1997.

M. Bellare, P. Rogaway, "Optimal Asymmetric Encryption", Eurocrypt '94, pp. 92–111, Springer–Verlag, 1994.

D. Chaum, "Blind Signatures For Untraceable Payments".

D. Chaum, T.P. Pedersen, "Wallet Databases with Observers".

(List continued on next page.)

*Primary Examiner*—Thomas R. Peeso
*Attorney, Agent, or Firm*—Schweitzer Cornman Gross & Bondell LLP

[57] ABSTRACT

A method is provided for an escrow cryptosystem combined with an unescrowed digital signature scheme that uses a single public key per user. This system is overhead-free, does not require a cryptographic tamper-proof hardware implementation (i.e., can be done in software), and is publicly verifiable. The system cannot be used subliminally to enable a shadow public key system. Namely, an unescrowed public key system that is publicly displayed in a covert fashion. The cryptosystem contains a key generation mechanism that outputs a key triplet, and a certificate of proof that the keys were generated according to the algorithm. The key triplet consists of a public key, a private decryption key, and a private signing key. Using the public key and the certificate, the triplet can be verified efficiently by anyone to have the following properties: (1) the private signing key is known to the user, and (2) the private decryption key is recoverable by the escrow authorities. The system assures that the escrow authorities are not able to forge signatures or get the private signing key. The system is designed so that its internals can be made publicly scrutinizable (e.g., it can be distributed in source code form).

20 Claims, 6 Drawing Sheets

OTHER PUBLICATIONS

D. Denning, D. Branstad, "A Taxonomy for Key Escrow Encryption Systems", Communications of the ACM, v. 39, n. 3, , 1996.

A. De Santis, Y. Desmedt, Y. Frankel, M. Yung, "How to Share a Function Securrely", ACM STOC '94, pp. 522–533, 1994.

Y. Desmedt. Y. Frankel, "Threshold cryptosystems", CRYPTO '89, pp. 307–315, Springer–Verlag, 1989.

Y. Desmedt, "Securing Traceability of Ciphertexts—Towards a Secure Software Key Escrow System", eurocrypt '95, pp. 147–157, Springer–Verlag, 1995.

W. Diffie, M. Hellman, "New Directions in Cryptography", IEEE Transactions on Information Theory, 22, pp. 644–654, 1976.

T. ElGamal, "A Public Key Crptosystem and a Signature Scheme Based on Discrete Logarithms", CRYPTO '84, pp. 10–18, Springer–Verlag, 1985.

P. Feldman, "A Practical Scheme for Non–interactive Verifiable Secret Sharing", 28th annual FOCS, pp. 427–437, 1987.

A. Fiat, A. Shamir, "How to Prove Yourself: Practical Solutions to Identification and Signature Problems", CRYPTO '86, pp. 186–194, Springer–Verlag, 1987.

Y. Frankel, M. Yung, "Escrow Encryption Systems Visited: Attacks, Analysis and Designs", CRYPTO '95, Springer–Verlag, 1995.

R. Ganesan, "How To Use Key Escrow", Communications of the ACM, v. 39, n.3, p. 33, 1996.

S. Goldwasser, S. Micali, R. Rivest, "A Digital Signature Scheme Secure Against Adaptive Chosen–Message Attacks", SIAM Journal on Computing, vol. 17, n. 2, 1988.

IBM, SecureWay, key recovery technology document, available at http://www.ibm.com/Security/html/wp–keyrec.html (downloaded May 25, 1997).

N. Jefferies, C. Mitchell, M. Walker, "A Proposed Architecture for Trusted Third Party Services", Cryptography: Policy and Algorithms, LNCS 1029, Springer, 1996.

J. Kilian, F. Leighton, "Fair Cryptosystems, Revisited", CRYPTO '95, pp. 208–221, Springer–Verlag, 1995.

L. Lacy, D. Mitchell, W. Schell, "CryptoLib: Cryptography in Software", AT&T Bell Labs, Crypto@research.att.com.

A. Lenstra, P. Winkler, Y. Yacobi, "A Key Escrow System with Warrant Bounds", CRYPTO '95, pp. 197–207, Springer–Verlag, 1995.

S. Micali, "Fair Public–Key Cryptosystems", CRYPTO '92, pp. 113–138, Springer–Verlag, 1992.

K. Nyberg, R. Rueppel, "Message Recovery for Signature Schemes Based on the Discrete Logarithm Problem".

T.P. Pedersen, "A Threshold Cryptosystem without a Trusted Party".

E. Verheul, H. Tilborg, "Binding ElGamal: A Fraud–Detectable Alternative to Key–Escrow Proposals", Eurocrypt '97, pp. 119–133, Springer–Verlag, 1997.

S. Walker, J. Winston, "Principles for Use of Encryption and Key Recovery", available at http://www.tis.com/docs/products/recoverkey/recoverkey.html (downloaded May 25, 1997).

A. Young, M. Yung, "Kleptography: Using Cryptography Against Cryptography", Eurocrypt '97, pp. 62–74, Springer–Verlag, 1997.

"Digital Systems", CRC Handbook of Applied Cryptography, Ch 11, pp. 425–444.

"Digital Systems", CRC Handbook of Applied Cryptography, Ch 11, pp. 445–464.

"Digital Systems", CRC Handbook of Applied Crytography, Ch 11, pp. 465–481.

AUTO-RECOVERABLE AND AUTO-CERTIFIABLE CRYPTOSYSTEM WITH UNESCROWED SIGNING KEYS

BACKGROUND

1. Field of Invention

The field of this invention is cryptography. This invention relates to digital signature schemes, and in particular to schemes that are compatible with auto-recoverable (also interchangeably called auto-escrowable) and auto-certifiable cryptosystems. The invention enables the implementation of a public key infrastructure (PKI) where the authorities can read selectively chosen encrypted messages, but cannot forge digital signatures, while each user possesses a single public key. The scheme introduces the notion of a three-key cryptosystem. This system involves the use of a private signing key, a private decryption key, and a single public key which is good for encrypting data and for signature verification. The device has the property that the private signing key is not escrowed, while the private decryption key is and the private signing key is not derivable from the private decryption key. The invention relates to cryptosystems implemented in software, but is also applicable to cryptosystems implemented in hardware.

2. Description of Prior Art

Public Key Cryptosystems (PKC's) allow secure communications between two parties who have never met before. The notion of a PKC was put forth in (W. Diffie, M. Hellman, "New directions in cryptography", IEEE Transactions on Information Theory, 22, pages 644–654, 1976). This communication can take place over an insecure channel. In a PKC, each user possesses a public key E and a private key D. E is made publicly available by a key distribution center, also called certification authority (CA), after the registration authority verifies the authenticity of the user (its identification, etc.). The registration authority is part of the certification authority. D is kept private by the user. E is used to encrypt messages, and only D can be used to decrypt messages. It is computationally impossible to derive D from E. To use a PKC, party A obtains party B's public key E from the key distribution center. Party A encrypts a message with E and sends the result to party B. B recovers the message by decrypting with D. The key distribution center is trusted by both parties to give correct public keys upon request. In the same paper by Diffie and Hellman the notion of a digital signature scheme was also proposed. A digital signature scheme allows a user to digitally "sign" a message using the private key known only to the user, to prove that the message comes from the user. For singatures, E is used to verify signatures and D is used to sign messages. To send a signature of message m, A applies its D function to the message and sends the result to user B. User B obtains A's public key E from the key distribution center and applies E to verify A's signature. The first public key cryptosystem and signature scheme is the RSA scheme (U.S. Pat. No. 4,405,829). A PKC and digital signature scheme based on the difficulty of computing discrete logarithms was published in (T. ElGamal, "A Public-Key Cryptosystem and a Signature Scheme Based on Discrete Logarithms", CRYPTO '84, pages 10–18, Springer-Verlag, 1985).

The Digital Signature Algorithm (DSA) is a discrete log based signature scheme that is patented (U.S. Pat. No. 5,231,668). DSA gets its security from the difficulty of computing discrete logs modulo the prime p, where p is at least 512 bits in size. It also gets its security from the difficulty of computing discrete logs in a cyclic subgroup of order q, where q is a 160 bit prime divisor of p−1. DSA outputs signatures that are 320 bits in length. The schnorr digital signature scheme is another discrete log based signature scheme (U.S. Pat. No. 4,995,082). Nyberg and Rueppel disclosed a set of ElGamal based variants that provide for message recovery (K. Nyberg, R. Rueppel, "Message Recovery for Signature Schemes Based on the Discrete Logarithm Problem, Eurocrypt '94, pages 182–193, 1994). The message recovery feature allows the message to be recovered from the signature itself, hence the message need not be sent along with the signature. Another important feature of digital signature schemes is blindability (D. Chaum, "Blind Signatures for Untraceable Payments", CRYPTO '82, pages 199–203). A scheme is blindable if it is possible for Alice to obtain a Bob's signature on a message of her choice such that Bob remains oblivious as to what he is signing and what the resulting signature is. In (D. Chaum, T. Pedersen, "Wallet Databases with Observers", CRYPTO '92, pages 89–105) a blindable scheme based on ElGamal is disclosed. A good overview of digital signature security is described in (S. Goldwasser, S. Micali, R. Rivest, "A digital Signature Scheme Secure Against Adaptive Chosen Message Attacks", SIAM J. Comput., vol. 17, n. 2, pages 281–308, 1988). Other signatures schemes are described in (B. Schneier, Applied Cryptography, 2nd edition, Wiley & Sons) and in (Menezes, Oorshot, Vanstone, "CRC Handbook of Applied Cryptography", pages 425–481).

In the pending U.S. Patent Application of Young and Yung entitled "Auto-escrowable and Auto-Certifiable Cryptosystems" (filed May 1997), a public key cryptosystem was disclosed that has the following properties. Users of the system can generate a public/private key pair and a certificate of recoverability. This certificate of recoverability can be used to both recover the private key by the escrow authorities, and verify that the private key is recoverable. The present invention draws many of its ideas from the Auto-Escrowable and Auto-Certifiable key escrow solution. Other methods for conducting key escrow are U.S. Pat. Nos. 5,276,737, and 5,315,658 which are due to Micali (1994). In these patents Micali discloses a Fair Public Key Cryptosystem (FPKC) which is based on the work of P. Feldman (28th annual FOCS). The FPKC solution is not as efficient in terms of use as Auto-Escrowable and Auto-Certifiable Cryptosystems. Furthermore, It has been shown that the Fair RSA PKC does not meet certain needs of law enforcement (J. Kilian, F. Leighton, "Fair Cryptosystems Revisited", CRYPTO '95, pages 208–221, Springer-Verlag, 1995), since a shadow public key cryptosystem can be embedded within it. A shadow public key system is a system that can be embedded in a key escrow system that permits conspiring users to conduct untappable communications. Kilian and Leighton disclose a Fail-safe Key Escrow system. This system has the drawback that it requires users to engage in a multi-round protocol in order to generate public/private key pairs. Other key escrow systems with similar inneficiencies are by De Santis et al., Walker and Winston (TIS), and the IBM SecureWay document. A "Fraud-Detectable Alternative to Key-Escrow Proposals" based on ElGamal has been described in (E. Verheul, H. van Tilborg, "Binding ElGamal: A Fraud-Detectable Alternative to Key-Escrow Proposals", Eurocrypt '97, pages 119–133, Springer-Verlag, 1997). This system provides for session level key recoverability, and makes no provision for preventing users from encrypting messages prior to using the Binding ElGamal system. Hence, it permits conspiring criminals to conduct untappable communicatinos. Both Binding ElGamal and the Auto-Escrowable and Auto-Certifiable Cryptosystems solutions employ the use of non-interactive zero-knowledge proofs. More specificly, they employ the Fiat Shamir heuristic which is disclosed in (A. Fiat, A. Shamir, "How to Prove Yourself: Practical Solutions to Identification and Signature Problems", CRYPTO '86, pages 186–194, Springer-Verlag, 1987). An overview of key escrow schemes appears in (D. Denning, D. Branstad, "A Taxonomy for Key Escrow Encryption Systems," Communications of the ACM, v. 39, n. 3, 1996). In (N. Jefferies, C. Mitchell, M. Walker, "A Proposed Architecture for Trusted Third Party Services", Cryptography: Policy and Algorithms, LNCS 1029, Springer, 1996) and (R. Anderson, "The GCHQ Protocol and Its Problems", Eurocrypt '97, pages 134–148, Springer-Verlag, 1997) a trusted third party approach to escrow is described where the trusted third parties of the participating users are involved in every session key establishment stage, and hence provides for another encumbersome solution as well.

The primary problem with implementing a digital signature scheme suitable for use with an escrow system is that very often the public signature verification key can be used as a public encryption key, and the corresponding private signing key can be used as a private decryption key. This is a problem because law enforcement sometimes has the need to be able to decrypt messages, and if messages are encrypted using a public signature verification key, then law enforcement needs to be able to have access to the corresponding private signing key. But this implies that law enforcement will have access to signature keys, and thus law enforcement has the ability to forge signatures of users. It also implies that law enforcement can impersonate users in interactive identification protocols and user authentication protocols. There is no legitimate reason that law enforcement should have this capability. This problem is discussed in (Y. Frankel, M. Yung, "Escrow Encryption Systems Visited: Attacks, Analysis and Designs", CRYPTO '95, pages 222–235, Springer-Verlag, 1995) and (R. Anderson, "The GCHQ Protocol and Its Problems", Eurocrypt '97, pages 134–148, Springer-Verlag, 1997). Hence, what is needed to enable authentication in an escrow system is a public and private key system that has the properties that (1) opening the decryption key does not enable a signing capability, and (2) the signing capability does not enable decryption.

Auto-Recoverable and Auto-Certifiable Cryptosystem with Unescrowed Signing Keys The present invention discloses a digital signature mechanism that, cannot be used for untappable wire communications. The Auto-Escrowable and Auto-Certifiable solution provides an efficient way to implement a public key infrastruce, thereby allowing privacy for users and allowing the authorities to access selected encrypted messages. The present invention builds on that solution and provides the added functionality of authentication and signature capabilities that are not escrowed. Thus users of the present invention can receive messages privately and can verify that authenticity of the sender.

SUMMARY OF THE INVENTION

In order to provide for the above objective the present invention introduces a new paradigm in cryptography. It introduces the notion of three-key cryptography. In three-key cryptography, users generate a pair of private signing and decryption keys, and a corresponding single public key. The public key can be used to encrypt data and verify the signatures. They keys have the property that given the pubic key, it is intractable to compute either private key. Similarly, given the public and private decryption key, it is intractable to compute the private signing key. In the present invention, the private decryption key is recoverable by the escrow authorities, and the private signing key remains private to the user. Because of the aforementioned properties, the escrow authorities are unable to recover the private signing key and are unable to forge signatures.

The present invention builds on the Auto-Escrowable and Auto-Certifiable solution, but adds secure unescrowed signature and authentication capabilities. Since the present invention is a three key system and allows unsecrowed authentication and signature keys, and since the Auto-Escrowable and Auto-Certifiable solution is a two-key system and only provides for escrowed encryption, the two inventions differ. We will describe the entire solution, which encompasses completely a system that provides for auto-escrowability, auto-certifiability, and unescrowed authentication keys.

The present invention provides a method to verify that a user generated private decryption key is contained within an encryption under the public key of the escrow authorities. Furthermore, this verification can be performed by anyone in possession of the escrow authorities public key. The key verification process of this invention assures that the user posses the private signing key corresponding to the public key that is being verified. The present invention consists of a key establishment process, a signing process, and a signature verification process. The key establishment process can be broken down into three functions which are key generation, key verification, and private decryption key recovery. In the setup process of the prefered embodiment, the participants agree upon a set of initial public parameters and the authorities generate an escrowing public key and corresponding private keys. The initial parameters and the escrowing public key are the public parameters of the system. The escrowing authorities, Certification Authority (CA), and users of the system all have access to the public parameters. In the key generation process, a public key, a private decryption key, a private signing key, and a certificate of recoverability is output. The certificate of recoverability not only proves that the private decryption key is recoverable by the escrow authorities, but it also proves that the prover knows the corresponding private signing key. The certificate is a string of information which includes an implicit encryption of the user's private decryption key under the escrowing public key. The signal information containing the user's public key and the certificate of recoverability can be transmited to any entity. In the verification process, the user transmits this signal to the verifier. The verification process takes the input signal, processes it, and outputs either true or false, denoted by 1 and 0, respectively. A result of true indicates that the user's private decryption key is recoverable from the certificate of recoverability by the escrow authorities and that the user is in possession of both private keys. A result of false indicates that the private key is not recoverable. The invention is designed such that it is intractable for the user to generate a public key, and certificate of recoverability such that the private decryption key is not escrowed and such that it passes the verification process with a result of true. In the prefered embodiment, the users certify their public keys with the registration authority of the certification authority (CA) who then signs their public key after successful verification. A public key together with a CA's signature on a string that contains the public key constitutes a certified public key. In more detail, upon receiving the user's public key, and certificate of recoverability, the CA verifies that the corresponding private decryption key is recoverable. If it is, (namely, the verification process outputs true) the public key is certified and/or made publicly available by the CA. The user is only required to keep his private keys, and to have access to the public key database containing public keys of other users as in a typical PKI.

The signing process takes a message, the escrowing public key, and the private signing key as input. It processes these signals and outputs a digital signature on the input message. The signature verification process takes the signers public key, the escrowing public key, the message, and the signature as input signals. It processes these signals and outputs either true or false. The output is true if the signature is a valid signature on the message under the private signing key corresponding to the public key of the signer. The output is false if the signature is invalid.

The encryption process takes a message and the user's public key. The message is encrypted using the public key, using the ElGamal PKC for instance. The ciphertext is then decrypted using the corresponding private decryption key.

In the recovery process, the escrow authorities use the user's certificate of recoverability, which is obtained from the CA, as an input signal. The escrow authorities process the certificate of recoverability, and the corresponding user's private decryption key or data encrypted using the corresponding public key is the resulting output signal. The escrow authorities never get access to the users signature key and cannot forge his signature.

The present invention is useful in any environment that demands the recovery of private decryption keys, or keys encrypted under these keys, or information encrypted under these keys. Such environments arise in law enforcement nationally and internationally, in the business sector, in secure file systems, etc. The present invention is also useful in applications that require authentication, and digital signatures. This includes authenticating messages using digital signatures and authentications conducted via the use of interactive identification protocols. The invention is especially useful in environments where both encryption is escrowed while authentication and signature keys should remain unescrowed.

The present invention is robust with respect to any underlying technology since it can be implemented in both hardware and software. When implemented in software it can be easily scrutinized to insure that it functions as desired and to insure that it does not compromise the security of its users. The software implementation allows for fast and easy dissemination of the invention, since it can be disseminated in source code form over diskettes or over a computer communication network. The invention does not require changes in communication protocols used in typical unescrowed PKI's (e.g., session key establishment, key distribution, secure message transmission, etc.). The invention is therefore compatible with typical PKI's. The present invention thus provides a very efficient way of escrowing and recovering cryptographic keys and allowing for digital signatures. The messages in the system can be sent in communication channels or stored in file systems or storage mediums.

THE DRAWINGS

The present invention will be described with reference to the accompanying FIGS. 1–9.

Figure 6:
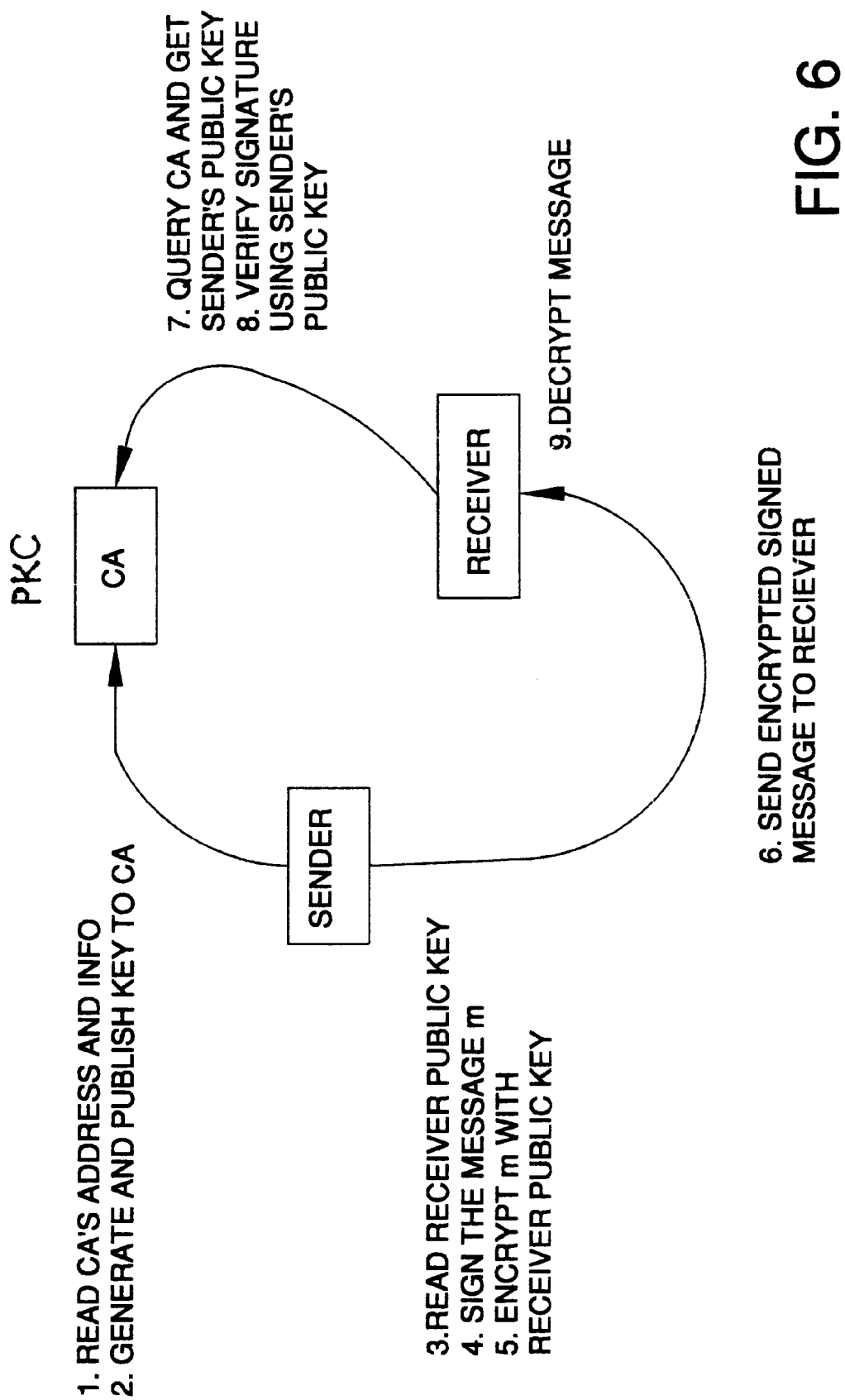

FIG. 6 describes a generic public key system with encryption and digital signature functionality, and its main components and operations.

Figure 7:
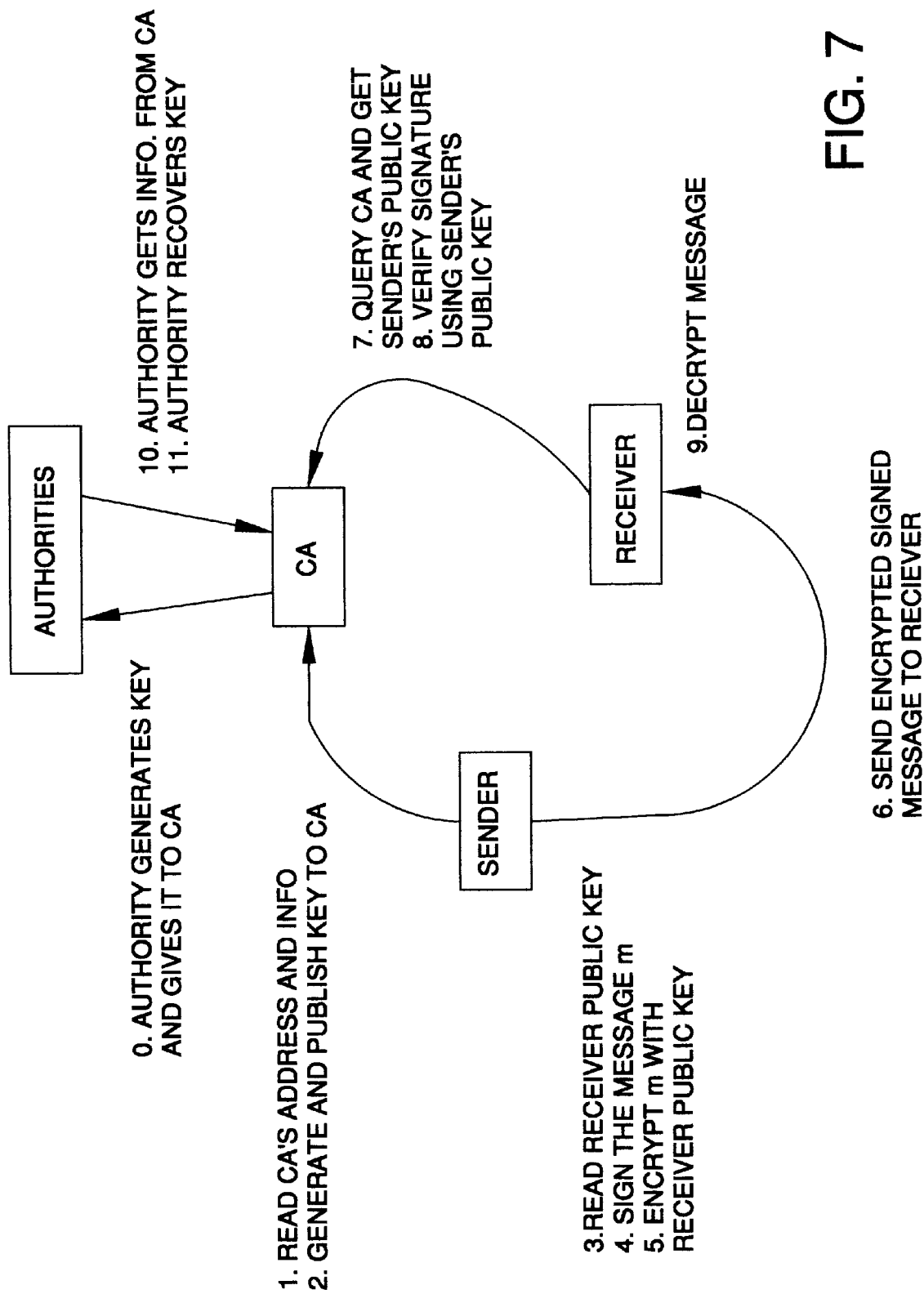

FIG. 7 describes an overview of the escrowable public key system with unescrowed digital signature functionality that constitutes the present invention.

Figure 8:
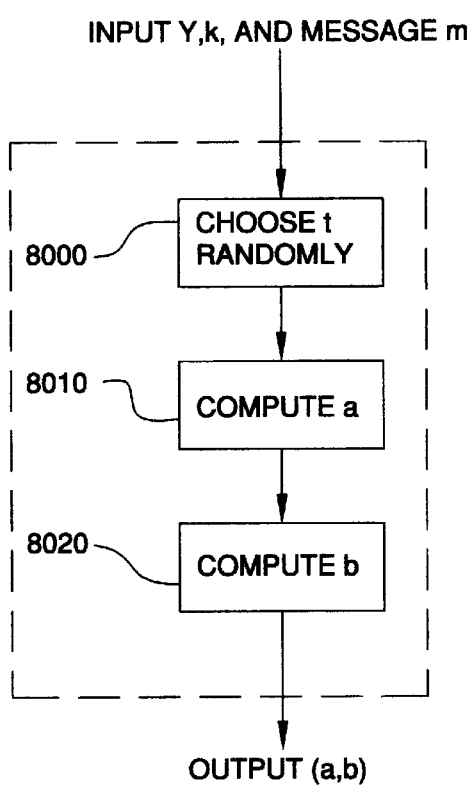

FIG. 8 describes the digital signing process.

Figure 9:
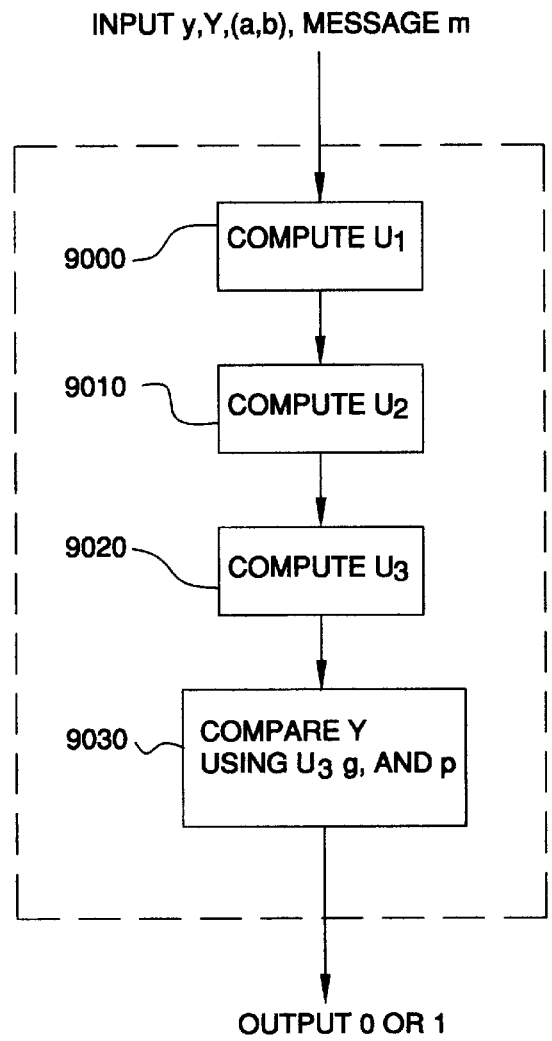

FIG. 9 describes the digital signature verification process.

DESCRIPTION OF THE INVENTION

The following is a description of the prefered embodiment of the present invention. Variations on the prefered embodiment will accompany the description of the prefered embodiment wherever applicable. For convenience in the presentation, the hashing algorithm selected is SHA (B. Schneier, Applied Cryptography, 2nd edition, pages 442–445), though any cryptographic hashing algorithm will suffice in its place. In the prefered embodiment, parameters are chosen uniformly at random from their respective groups.

Figure 1:
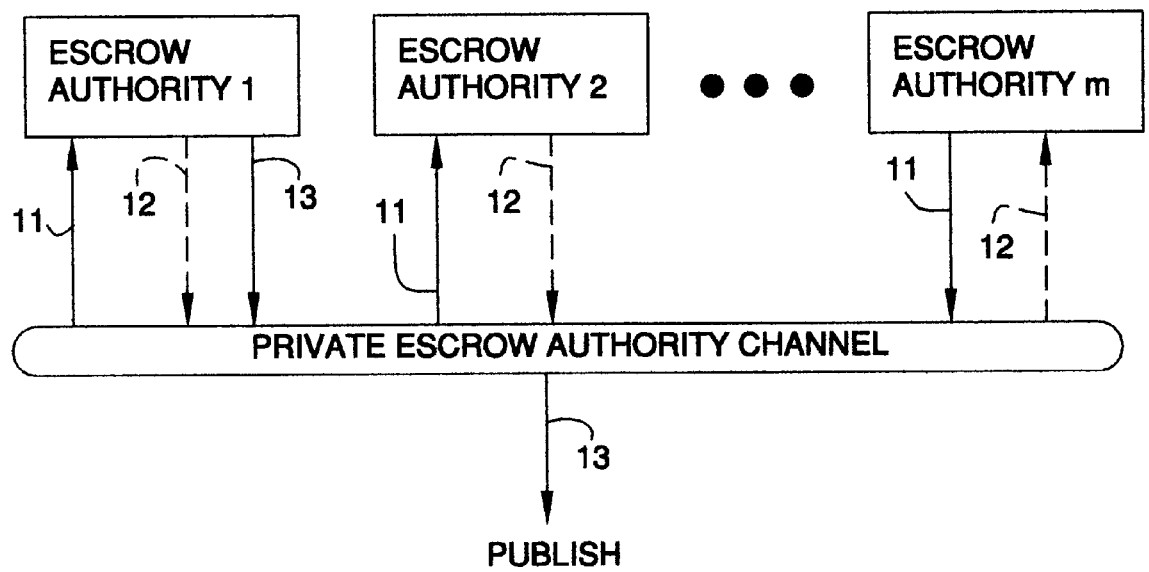
FIG. 1 is a data flow diagram of the process of setting up the method of the invention for use with m escrow authorities.

The system setup of the prefered embodiment is the same as in the pending application "Auto-Escrowable and Auto-Certifiable Cryptosystems", by Young and Yung. For completeness it is shown in FIG. 1. This system setup initiates the cryptosystem. In the prefered embodiment, the participants agree upon a large prime r such that $q=2r+1$ is prime and $p=2q+1$ is prime. Examples of values for r that satisfy this relation are 5 and 11, though they are small values. The following is a 1024 bit value for r in hexadecimal:
fd90e33af0306c8b1a9551ba0e536023b4d2965d
3aa813587ccf1aeb1ba2da82489b8945e8899bc546dfded-
24c861742d2578764a9e70b88a1fe9953469c7b5b89b1b-
15b1f3d775947a85e709fe97054722c78e31ba202379e1e-
16362baa4a66c6da0a58b654223fdc4844963478441-
afbbfad7879864fe1d5df0a4c4b646591

An r of size 1024 bits is large enough for use in cryptographic systems. Such values of r, q, and p are not as easy to find as merely finding a prime number, but doing so is not intractable. What is needed is highly efficient algorithms which can be implemented using, say, a multiprecision library. Such algorithms include Karatsuba multiplication, Montgomery reduction, addition chains, and the Rabin-Miller probabilistic primality test (J. Lacy, D. Mitchell, W. Schell, "CryptoLib: Cryptography in Software," AT&T Bell Laboratories, cryptolib@research.att.com). An efficient method for finding such primes is described in the aforemention pending patent application.

The participants agree upon, or the CA chooses, a value g which generates $\{1,2,3,\ldots,p-1\}=Z_p$, and an odd value $g_1$ which generates $Z^*_{2q}$. The algorithm which finds such generators is well known by those skilled in the art. Note that 2q is a multiplicative group and has a generator. g and s are odd in the prefered embodiment. The values r, q, p, g, and $g_1$ are the systems initial parameters and are made publicly available with no loss of security. They can be chosen by the authorities themselves and/or anyone else. Once $g_1$ and q are specified, the m authorities ($m \geq 1$) proceed to collectively compute an escrow authority public key (Y, $g_1$, 2q), also called the escrowing public key, and escrow authority private keys $z_1, z_2, \ldots, z_m$. To do so, authority i, where i ranges from 1 to m, chooses a value $z_i$ in $Z_{2r}$ at random and then sets $Y_i$ to be $g_1$ raised to this value modulo 2q. At least one authority then receives all of the information of the $Y_i$'s from the m−1 other escrow authorities. In the prefered embodiment, authority i, where i ranges from 2 to m, sends $Y_i$ to authority 1. The sending of the $Y_i$'s is depicted by step 11 in FIG. 1. Y is computed to be the product of the $Y_i$'s modulo 2q by at least one of the authorities, where i ranges from 1 to m. In the prefered embodiment, Y is computed by authority 1. Authority 1 then verifies that $(g_1/Y)$ is a generator of $Z^*_{2q}$. If it isn't then step 12 is executed. In step 12 the other m−1 authorities are told to choose new values for z, hence the procedure is restarted from the beginning of step 11. In the prefered embodiment, authority 1 chooses $z_1$, over again also. In an alternative embodiment, at least 1 and less than m of the authorities generate new values for z. This process is continued as many times as necessary until $(g_1/Y)$ is a generator of $Z^*_{2q}$. Y is then published, or otherwise made available to the users and the CA, by one or more of the escrow authorities. This is depicted by step 13 in FIG. 1. This concludes the systems set-up which follows the one in Young and Yung's pending application.

Figure 2:
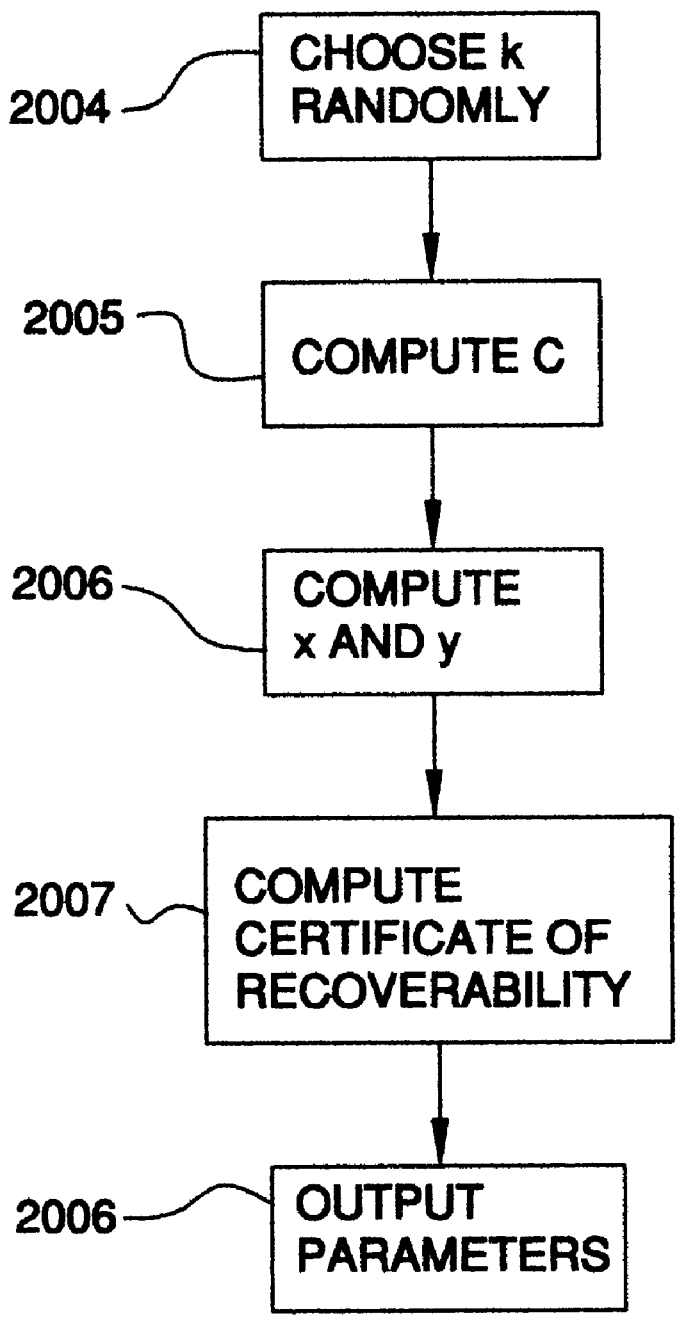
FIG. 2 is a flow chart of the basic steps of the process of generating a public key, the private decryption key, the private signing key, and the certificate of recoverability using the invention.

FIG. 2 is a diagram showing the process of how a user's system generates a public key, private decryption key, private signing key, and a certificate of recoverability. Having obtained the signal Y that is made available to users by the escrow authorities or by the CA, the user system proceeds to generate an ElGamal public key (y, g, p) for the user. The signal Y may a priori have been included in the invention. The invention proceeds by choosing the private signing key k in $Z_{2r}$ randomly. This is depicted by step 2004 in FIG. 2. In step 2005, the invention computes $C = g_1^k$ mod 2q. In step 2006 the invention computes the user's private decryption key x to be $(g_1^k/Y^k)$ mod 2q. The invention also computes y to be $g^x$ mod p. The values k, x, and y are output by the invention. The private decryption key x and the private signing key k are kept private by the user. The public key (y,g,p) can be made public. The certificate of recoverability can be published globally, but it should be noted that it can be used to establish a shadow public key infrastructure. Therefore it is preferable that the certificate will be given only to the CA.

The system then proceeds to step 2007 and computes a certificate that can be used by any interested party to verify that the user's private decryption key is properly encrypted within C. The certificate contains the value v, which is computed by the system to be (g raised to the power w) mod p, where w is $(1/Y^k)$ mod 2q. The public key parameter y can be recovered from C and v by computing (v raised to the C power) mod p. The system also processes three non-interactive zero-knowledge proofs as they are called in the art and includes them in the certificate. Let n denote the number of repetitions in each non-interactive proof. In the prefered embodiment, n is set to be 40. The first proof is designed so that the user can prove that he or she knows k in C. The second proof is designed so that the user can prove that he or she knows k in v. The last proof is designed so that the user can prove that he or she knows k in (v raised to the C power) mod p. By saying "the user knows value x" we mean that the system of the user has the value x in its state, or in its memory.

In more detail, to construct the non-interactive proofs, the system proceeds as follows. It chooses the values $e_{1,1}$, $e_{1,2}, \ldots, e_{1,n}, e_{2,1}, e_{2,2}, e_{2,3}, \ldots, e_{2,n}$, and $e_{3,1}, e_{3,2}, e_{3,3}, \ldots, e_{3,n}$ in $Z_{2r}$ randomly. For i ranging from 1 to n, the system sets $I_{1,i}$ to be $g_1$ raised to the $e_{1,i}$ power mod 2q. For i ranging from 1 to n, the invention sets $I_{2,i}$ to be v raised to the $d_i$ power mod p, where $d_i$ is Y raised to the $-e_{2,i}$ power modulo 2q. For i ranging from 1 to n, the invention sets $I_{3,i}$ to be y to the $t_i$ power mod p, where $t_i$ is $(g_1/Y)$ raised to the $e_{3,i}$ power mod 2q. The invention then computes the value rnd to be the SHA hash of the set formed by concatenating together the tuples $(I_{1,i}, I_{2,i}, I_{3,i})$ for i ranging from 1 to n. Note that rnd is a function of all of the I values, using a suitably strong cryptographic hash function. In alternate embodiments, the hash function can have an effective range of size different than 160 bits. A greater range of the hash function allows for significantly larger values for n. The system sets each of the bit-sized values $b_{1,1}, b_{1,2}, \ldots, b_{1,n}$, $b_{2,1}, b_{2,2}, \ldots, b_{2,n}, b_{3,1}, b_{3,2}, \ldots, b_{3,n}$ to be each of the corresponding 3n least significant bits of rnd. There are a multitude of ways in which an embodiment can securely assign the bits of rnd to the values for b. The values for b are the challenge bits, and this method of finding them is known as the Fiat-Shamir Heuristic (A. Fiat, A. Shamir, "How to Prove Yourself: Practical Solutions to Identification and Signature Problems", CRYPTO '86, pages 186–194, Springer-Verlag, 1987). The system then proceeds to compute the responses to these challenge bits. For i ranging from 1 to 3 and for j ranging from 1 to n, the invention sets $z_{i,j}$ to be $e_{i,j} + b_{i,j}$ k mod 2r. This completes the description of step 2007 of FIG. 2.

The system proceeds to step 2008. In step 2008, the invention outputs the parameters C, v, y, $(I_{1,i}, I_{2,i}, I_{3,i})$, and $(z_{1,i}, z_{2,i}, z_{3,i})$ for i ranging from 1 to n. The user has the option to later interactively prove that his or her private decryption key x is recoverable by the escrow authorities. This will be addressed in more detail later. Also, the values b can be made a part of the certificate. This step is however, not necessary, since the values for b can be derived from the values for I alone.

Figure 3:
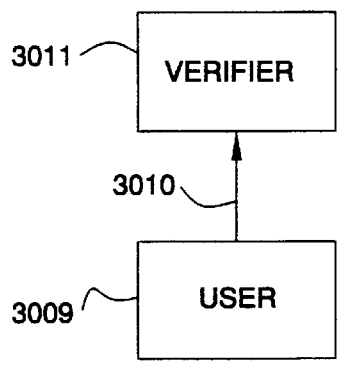
FIG. 3 is a data flow diagram of the process of verifying the recoverability of a private key.

The description of the embodiment has thus far explained how the system is setup for use by the CA and authorities, and how the system is used by users (potential receivers and senders) to generate the public key, private decryption key, private signing key, and the certificate of recoverability. These certificates are strings that show to anyone that is presented with them that the keys generated have the publicly specified properties. The following describes how the invention is used by the user to prove to a verifier that x is recoverable from C. This process is depicted in FIG. 3. The verifier can be the CA, an escrow authority, or anyone else who is part of the system. The verification also establishes certainty that the user possesses the correct private keys corresponding to the public key.

The verification process of FIG. 3 is as follows. In step 3009, the user generates the public and private keys, and the certificate using the invention as described above. In step 3010, the user transmits a signal containing these parameters to a verifier. In step 3011 the verifier uses this signal to verify whether or not the user's private decryption key is recoverable by the escrow authorities. To do so, the verifying system uses the user's public key, the encryption C from the certificate, the rest of the certificate, and the escrowing public key Y.

The way in which the user's signal is processed will now be described in detail. The verifying system outputs a 0 (false) if the public key and/or certificate are invalid, and a 1 (true) otherwise. The invention may take subsequent actions and may indicate to the verifier that the public key is invalid in the event that 0 is returned. Similarly, the verifying system may inform the verifier of a validation that passes.

To perform the verification, the verifying system verifies that y equals (v raised to the C power) mod p. If y is not equal to (v raised to the C power) mod p, then the verification system returns a value of 0. The verifying system also verifies the three non-interactive proofs contained within the certificate of the user. The invention computes $(b_{1,i}, b_{2,i}, b_{3,i})$ for i ranging from 1 to n in the same way as performed during the certificate generation process. Recall that this process was described in regards to FIG. 2.

For the first non-interactive proof, the verifying system checks that $g_1$ raised to the $z_{1,i}$ power equals $CI_{1,i}$ mod 2q if $b_{1,i}=1$, for i ranging from 1 to n. The verifying system also checks that $g_1$ to the $z_{1,i}$ power equals $I_{1,i}$ mod 2q if $b_{1,i}=0$, for 1 ranging from 1 to n. If any of these equalities fails, then the verifying system returns a value of 0. This completes the verification of the first non-interactive proof.

For the second non-interactive proof, the verifying system checks that g raised to the $w_i$ power equals $I_{2,i}$ mod p if $b_{2,i}=1$, for i ranging from 1 to n. Here $w_i$ is (1/Y) raised to the $z_{2,i}$ power mod 2q. The verifying system also checks that v to the $v_i$ power equals $I_{2,i}$ mod p if $b_{2,i}=0$, for i ranging from 1 to n. Here $v_i$ is (1/Y) to the $z_{2,i}$ power mod 2q. If any of these equalities fail, then the verifying system returns a value of 0. This completes the verification of the second non-interactive proof.

For the third non-interactive proof, the invention checks that g raised to the $w_i$ power equals $I_{3,i}$ mod p if $b_{3,i}=1$, for i ranging from 1 to m. Here $w_i$ is $(g_1/Y)$ raised to the $z_{3,i}$ power mod 2q. The invention also checks that y to the $v_i$ power equals $I_{3,i}$ if $b_{3,i}=0$, for i ranging from 1 to m. Here $v_i$ is $(g_1/Y)$ raised to the $z_{3,i}$ power mod 2q. If any of these equalities fails, then the verifying system returns a value 0.

Note that the verification steps can be done in arbitrary order. If all of the above verifications pass, then the value 1 is output by the verifying system. In an alternate embodiment, the verifying system may take subsequent actions. For example, the verifying system may verify that r, q, and p are prime and that p=2q+1, and that q=2r+1. It may also verify that g, $g_1$, and $(g_1/Y)$ are generators. Furthermore, it may check that these values are the values that are publicly specified. The above checks and variations thereof are well known to those skilled in the art.

Figure 4:
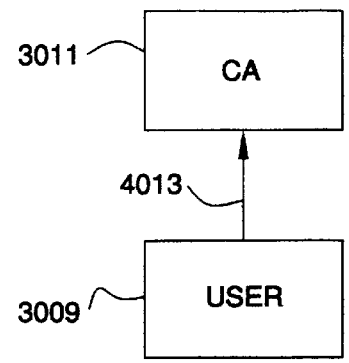
FIG. 4 is a data flow diagram of the process of registering a key using the invention.

In FIG. 4, the user certifies his or her public key with the CA. In step 4012 of this process, the user generates his or her public key and certificate of recoverability, as previously described. The user transmits this signal to the CA. This corresponds to step 4013 of FIG. 4. In step 4014 the CA acts as a verifier and verifies that the user's private decryption key is recoverable by the escrow authorities. So far, steps 4012 through 4014 are identical to steps 3009 through 3011 in the key verification process of FIG. 3. However the CA, in addition, will make keys that pass the verification process available to others upon request and/or certify them, for example, by signing them. If the user supplied values fail the verification process, then either the certification attempt is ignored, or alternatively the user is notified of the failed certification attempt.

Depending on the demands of the environment in which the invention is used, users may be required to submit extra information in order to register a public key and to certify that they know the private key portions without divulging them. Such information could be a password, social security number, previously used private key, etc. Such verifications are common in the art. In the case that the CA is a trusted entity, the CA can simply digitally sign the user's public key, and make the key along with the CA's signature of that key available on request. If the CA is not trusted, then the certificate should be stored in the public file and the certificate together with the certificate of recoverability should be given to the escrow authorities, who in turn can insure recoverability. This completes the description of the public key certification process.

Figure 5:
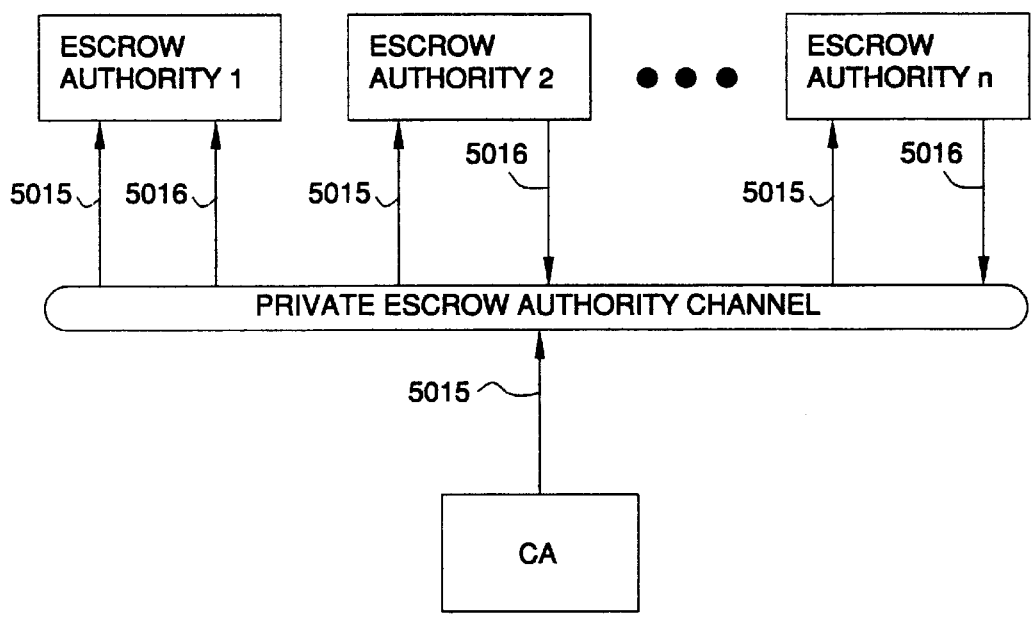
FIG. 5 is a data flow diagram of the process of private decryption key recovery by the escrow authorities.

The last key establishment process to describe is the private decryption key recovery process. This process is depicted in FIG. 5. In this process, the invention is used by the n escrow authorities to recover the user's private decryption key based on C. In this process, all m of the escrow authorities obtain C, as depicted in step 5015 of FIG. 5. In an alternate embodiment the CA transmits C and/or other parameters to one or more of the authorities. Thus they are already in possession of C. At this point escrow authority i computes $t_i$ to be (C raised to the $z_i$ power) mod 2q. Recall that $z_i$ is the private key of the ith escrow authority. This is done for i ranging from 1 to m. Authorities 2 through m then send their respective values for t to authority 1, as depicted in step 5016. Authority 1 then computes $Y^k$ mod 2q to be the product of the values for $t_i$ where i ranges from 1 to m, where the product is taken mod 2q. Authority 1 then obtains the user's private key x by computing $x=(C/Y^k)$ mod 2q. There are alternative methods in the art for computing x so that x is represented distributively among the authorities. These methods also allow the authorities to decrypt messages encrypted under the public key corresponding to x, without revealing x itself. Knowing x does not divulge k, since x is a one-way function of k.

The signing process is depicted in FIG. 8 and is as follows. The signing device takes a message m as input. Here m is the message being signed (m can either be cleartext or encrypted data). The signing device also takes Y and the private signing key k as input. The signing device then processes these input signals as follows. It chooses a value t from $Z_{2r}^*$ uniformly at random. This corresponds to step 8000. It then computes a to be $H(m)(g_1/Y)^{-t}$ mod 2q. This corresponds to step 8010. Here H is a suitable one-way function. It computes b to be $t^{-1}(a+k)$ mod 2r. This corresponds to step 8020. The signature on m is the pair (a,b) and this value is output by the device.

The signature verification process is depicted in FIG. 9 and is as follows. The signature verification device takes (a,b), m, y, and Y as input signals. The signature verification device computes $u_1$ to be $(H(m)/a)^b$ mod 2q. This is depicted in step 9000. The device computes $u_2$ to be $(g_1/Y)^{-a}$ mod 2q, which corresponds to step 9010. The device then computes $u_3$ to be ($u_1$ times $u_2$) mod 2q, corresponding to step 9020. If y equals (g raised to the $u_3$ power) mod p, then the device outputs 1. Otherwise, the device outputs 0. This computation corresponds to step 9030. A result of 1 indicates that the signature is valid, a result of 0 indicates that the signature is not valid.

An overview of the use of signatures together with encryption in the present invention is given in FIG. 7. Here, the use of the system is identical to the traditional use of a public key system with signatures as depicted in FIG. 6, the only difference is that there are escrow authorities that interact with the Certification Authority during system setup and during message recovery.

What has been described is an Auto-Recoverable and Auto-Certifiable cryptosystem that provides for unescrowed digital signatures. The users of such a cryptosytem employ the public key system in a way that is identical to a typical public key system. This is demonstrated schematically in FIG's 6 and 7. FIG. 6 is a typical public key system in a PKI environment. The following are the steps that are followed by the users. (1) The user first reads the CA's information and address. (2) The user generates a public key and private decryption key and sends the public key to the CA. The registration authority in the CA verifies the identity of the user, and publishes the public key together with the CA certificate on that key, identifying the user as the owner of that key. (3) A sender reads the receiver's (message recipient) public key from the CA and verifies the receiver's public key with certificate of the CA on that key. (4) The sender digitaly sign the message m to be sent using his private signing key. (5) The sender encrypts m with the receiver's public key. (6) The sender sends the encrypted signed messaged to the receiver. (7) The receiver queries the CA and gets the sender's public key.

(8) The receiver verify's the signature using the sender's public key (and may disregard it if it isn't authentic). (9) The receiver then decrypts the message with his or her private decryption key. FIG. 7 schematically describes the cryptosystem of the present invention. The additional operations are as follows. (0) The authority generates the escrowing public key and gives it to the CA. (10) The authority gets information from the CA including public keys, and/or certificates of recoverability. (11) The authority recovers the private signing key of a user (or data encrypted under that key).

In an alternative embodiment, the encryption device predetermines random values k for use in ElGamal encryptions and precomputes $g^k$ mod p. When the device receives messages m, it uses these precomputed values to encrypt the messages m, and thus avoids the overhead of performing a modular exponentiation. This is useful for bulk encryption of data. In another embodiment, the device predetermines random values t for use in the digital signature scheme of the primary embodiment. The signing device precomputes the values $(g_1/Y)^{-t}$ mod 2q. This allows the device to handle signing messages in bulk faster.

In an alternative embodiment, the signing process and signature verification process are designed so as to permit message recovery. In this embodiment, the signing process proceeds as follows. The signing device takes a message m<2q as input. Here m is the message being signed. m should ideally consist of an acual message combined with a string representing redundancy on the actual message, which is preprocessed in a specific way. This helps to avoid existential forgeries. The signing device also takes Y and the private signing key k as input. The signing device then processes these input signals as follows. It chooses a value t from $Z_{2r}^*$ uniformly at random. It then computes a to be $mg^u$ mod p, where u is $-(g_1/Y)^t$ mod 2q. It computes b to be a−t+k mod 2r. The signature on m is the pair (a,b). The corresponding signature verification process (i.e., message recovery process) acts on a and b and proceeds as follows. We recover m by computing $ay^u$ mod p, where u is $(g_1/Y)^{a-b}$ mod 2q.

In yet another embodiment, the signing process and verification process are designed so as to permit the blind signing of messages. The signing device takes the message m<2r, Y, and the private signing key k as input. It then chooses a value t from $Z_{2r}^*$ uniformly at random. It computes a to be $(g_1/Y)^t$ mod 2q. It computes b=t−k−a+m mod 2r. The signature on m is the pair (a,b). The corresponding signature verification process is as follows. The device computes u to be $(g_1/Y)^{a+b-m}$ mod 2q. If $g^a = y^u$ mod p, then the signature verification device outputs 1. Otherwise, it outputs 0. Suppose Alice wants bob to sign the message M. To do so, Alice chooses w in $Z_{2r}^*$ randomly and sends Bob the message m=w+M mod 2r. Bob then signes m using the signing device, and sends Alice the signature (a,b) on m. Alice then computes (a',b')=$(a(g_1/Y)^w$ mod 2q, b+w mod 2r), which is a signature on M. Applications of blinded signatures are known in the art.

In an alternative embodiment any large enough subset of the authorities can recover the private key x or messages encrypted under the public key corresponding to x without revealing x itself. This is done independently by receiving the appropriate values for t by the other authorities. This adds robustness in the case that some or all of the authorities cannot be completely trusted or are otherwise unavailable. Also, the authorities can require that the certificate of recoverability be sent along with the public key and encryption so that the user's parameters can first be verified using the verification process.

In an alternative embodiment, the non-interactive zero-knowledge proofs are conducted intercatively using truly random challenge bits. Thus the prover engages in a protocol to prove to the the verifier that the prover knows the private signing key k. Such modifications to proofs are known to those skilled in the art.

Another application of the present invention is using the private signing key to conduct interactive identifications. In this scenario, a user seeks to prove that he or she is who he or she claims to be. The second user, called a verifier, who posseses the public key and certificate of the claimed identity, engages in an interactive protocol. This protocol is the interactive version of the verification device described herein, where random challenges are sent by the verifier rather than being computed by SHA. This is useful for such applications as logging into a remote terminal, etc.

The following are a few alternate embodiments of the present invention. An alternate embodiment of this invention involves using an authority public key of the form (Y, g, 2q$^t$), where t is some integer greater than 1. We chose t to be 1 in our prefered embodiment, though other values can be used instead and still operate based on primitive roots. Another alternate embodiment is to use the product of two or more large primes as part of the public parameters. Clearly, the exact structure of the moduli used can vary significantly without departing from the scope of the invention.

In another variant the users publish their public keys which are used for key exchanges in a Diffie-Hellman like "key exchange". For example, the following method can be used. Let a be user A's private key and let b be user B's private key. Let $y_a$=(g to the power a) mod p be user A's public key and let $y_b$=(g to the power b) mod p be user B's public key. To establish a random session key, user B chooses a random string s. User A then sends m=($y_b$ to the a power)s mod p to user B. User B recovers s by computing m/($y_a$ to the power b) mod p. Users A and B derive a session key from s using a known public function (e.g., applying to it a one-way hash function). Later, when the session key is required to be taken out of escrow, the trustees can use either a or b to recover s, and hence the session key.

An application of this invention is a multi-escrow authority system where each escrow authority has its own CAs and users. When users from two different escrow authorities conduct secure communication the two escrow authorities can retrieve the user's messages or keys and exchange them through bilateral agreement. This is applicable to international multi-country scenarios.

Thus, there has been described a new and improved key escrow system which allows for unescrowed digital signatures, its variants, and applications. It is to be understood that the prefered embodiment is merely illustrative of some of the many specific embodiments which represent applications of the principles and paradigms of the present invention. Clearly, numerous and alternate arrangements can be readily devised by those who are skilled in the art without departing from the scope of the present invention.

The above description of our cryptosystem suggest novel cryptographic functions. It shows how to design a trapdoor function where a public function has a corresponding private function (the private decryption function) which by itself has a corresponding private function (the signing function). Knowing any function in this nested arrangement does not reveal its corresponding private function. We refer to such a function as a nested trapdoor. Further nesting of such functions is possible.

What we claim is:

1. A method and apparatus for generating a public key for encryption and signature verification and a proof that the keys were generated by a specific algorithm comprising the steps of:
   A) the user's system generating a random string of bits based on system parameters;
   B) the user running a key generation algorithm to get a private signing key, private decryption key, and a public key using the random string and public parameters;
   C) the user constructing a proof which does not compromise the private keys but at the same time provides confidence to other verifying entities that said keys were generated properly by the specified algorithm.

2. A method for users in a cryptosystem wherein each user has one public key, a corresponding private decryption key, and a corresponding different private signing key comprising of the following set of operations:
   A) an encryption operation where user A encrypts a message intended for user B using the public key of said user B;
   B) a decryption operation where user B decrypts a message sent from user A using the private decryption key of user B;
   C) a signature operation where user A signs a message intended for user B using the private signing key of said user A;
   D) a signature verification operation where user B verifies a message allegedly sent from user A using said public key of said user A.

3. A method, using a cryptosystem, for a user to digitaly sign a message m such that the other users can verify the resulting signature using said users public key, where the public key, private decryption key, and private signing key of said user are drawn from at least three different domains, F1, F2, and F3, where the signing operation comprises the steps of:
   choosing at least one value uniformly at random from one of said domains;
   using said random value to compute a digital signature s, where s consists of at least two values drawn from said set of domains;
   outputing s to the user;
and the signature verification operation performed by said other users comprises of using said users public key, system parameters, said user's said digital signature s, and said user's message m to check validity conditions derived from said signing operation.

4. A cryptosystem with encryption, decryption, signing, and signature verification operations whereby said operations are performed in any of three domains, F1, F2, and F3 such that F1 is the exponent domain of F2 and F2 is the exponent domain of F3.

5. A method for public key cryptosystem including a subset of the operations of encryption, decryption, key exchange, signing, signature verification, and authentication, involving a public key function based on nested trapdoors functions.

6. A method for generating a public key and a private key, for signing messages, and for verifying messages, where said private key can be used to electronically sign documents but which cannot be used in whole or in part to decrypt data which is encrypted using said public key.

7. A method comprised of the generation of a public key for encryption and signature verification according to a specified algorithm and for the correctness validation of said generation, wherein said public key is generated based on system parameters together with a corresponding decryption private key and signing private key which remains secure, and where said correctness validation is based on a validation proof which comprises additional strings of information which do not compromise the security of said private keys and at the same time enables other entities with access to said public key and said additional strings to execute a validation procedure which assures said other entities that said public key was generated properly according to said specified algorithm.

8. A method as in claim 7 where said proof provides confidence that said user is in possession of said private decryption and said private signing key.

9. A method as in claim 8 where said proof also provides confidence that said private decryption key is recoverable by the predetermined entities.

10. A method as in claim 8 where said verifying entities are components of a certification authority, with the further step that after successful verification said user is registered into a public key infrastructure.

11. A method as in claim 7 wherein said generation of public key comprises the operations of:
   choosing said private signing key k randomly in domain F3;
   computing said private decryption key x in domain F2 based on k;
   computing said public key y in domain F1 based on k and said system parameters;
and said correctness validation comprises the operation of the users system computing a zero-knowledge proof that establishes that x is recoverable by said predetermined entities given y and a transcript of said proof.

12. A method as in claim 7 where said system parameters are a large prime r, a large prime q=2r+1, and a large prime p=4r+3, an odd value $g_1$ where $g_1$ generates all values less than $Z_{2q}$ and which are relatively prime to 2q, a value g which generates $Z_p$, and the public key Y of said predetermined entities, and where said generation of public key comprises the operations of:
   choosing said private signing key k in $z_{2r}$ uniformly at random;
   computing said private decryption key x to be $(g_1/Y)^k$ mod 2q;
   computing y=(g to the power x) mod p;
   computing user's said public key (y,g,p)
and where said correctness validation comprises the operations of:
   computing C=($g_1$ to the power k) mod 2q;
   computing v=g raised to the ((Y to the power −k) mod 2q) power mod p;
   computing a transcript for P1, which constitutes a zero-knowledge proof of knowledge of k in C;

computing a transcript for P2, which constitutes a zero-knowledge proof of knowledge of k in v;

computing a transcript for P3, which constitutes a zero-knowledge proof of knowledge of k in (v to the C power) mod p;

where said proof resulting from said correctness validation is the string (C,v) and the transcripts P1, P2, and P3.

13. A method for an entity to verify the recoverability of a private decryption key generated as in claim 7 comprising the steps of:

the entity obtaining said system parameters;

the entity obtaining said public key which was allegedly generated in said generation of public key of claim 7;

the entity obtaining said proof which is allegedly derived from said correctness validation of claim 7; and the verification comprises the steps of:
  A) checking that the proof is a valid proof of knowledge;
  B) checking consistency conditions between and regarding the said alleged proof, said alleged public key, and said system parameters;
  C) if all checks succeed output true, otherwise output false.

14. A method as in claim 13, where the input comprises the alleged public key (y,g,p) and the alleged proof which is the string (C,v) and transcripts P1, P2, and P3 and where step A consists of the following operations:

verifying that P1 is a valid proof of knowledge of k in C, verifying that P2 is a valid proof of knowledge of k in v, and verifying that P3 is a valid proof of knowledge of k in (v to the C power) mod p;

and where step B consists of the following operations:

verifying that the system parameters that are supplied as input agree with the predetermined system parameters;

verifying that y equals (v to the C power) mod p.

15. A method for a predetermined entity to recover the private decryption key of a user wherein the keys of said user were generated as in claim 7, comprising the steps of:

retrieving the public key of said user;

retrieving the proof of said user;

recovering said user's private decryption key based on said system parameters, said public key, said proof, and private keys corresponding to public key which is part of said system parameters which is owned by said predetermined entities, or recovering information encrypted under said user's public key.

16. A method as in claim 15 where said predetermined entity is able to monitor communications of users suspected of unlawful activity such that said predetermined entity is unable to forge signatures of or impersonate any users at any time.

17. A method as in claim 15 where the predetermined entity is a government body, local, state, national, or international law-enforcement agency, or officer of a corporation.

18. A method as in claim 7, with the additional step of using the generated keys to encrypt and digitally sign messages wherein the random parameters and the exponentiation operations involving said random parameters are chosen and computed, respectively, prior to obtaining said messages, and independent of said messages.

19. A method, using a crypto-system, where the keys are generated as in claim 7, wherein a user requesting a signature on message m submits a randomly modified message corresponding to said message m, to the signer, whereby said signer produces a signature on said modified message without being able to determine m and where upon receiving said signature on said modified message, said user requesting a signature recovers a valid signature on m by the signer such that said signer cannot compute said valid signature.

20. A method as in claim 7, with the additional step of using the generated keys to sign messages, wherein a user signs a message m to produce a signature s using said user's private signing key such that said message m is recovered from said signature s during signature verification.

* * * * *